United States Patent

Okimura et al.

[11] Patent Number: 5,955,046
[45] Date of Patent: Sep. 21, 1999

[54] CATALYTIC MATERIAL FOR REMOVING NITROGEN OXIDES APPARATUS FOR TREATING NITROGEN OXIDES USING THE MATERIAL, AND METHOD OF REMOVING NITROGEN OXIDES

[75] Inventors: Yasuyuki Okimura, Inuyama; Hitoshi Yokoi, Aichi-ken; Kazushige Ohbayashi; Tadashi Hattori, both of Nagoya, all of Japan

[73] Assignee: NGK Spark Plug Co., Ltd., Nagoya, Japan

[21] Appl. No.: 08/922,566

[22] Filed: Sep. 3, 1997

[30] Foreign Application Priority Data

Sep. 25, 1996 [JP] Japan .................................. 8-253167
Jan. 27, 1997 [JP] Japan .................................. 9-012797

[51] Int. Cl.$^6$ .............................. B01J 8/02; B01J 23/40; B01J 23/60
[52] U.S. Cl. ..................... 423/239.1; 423/213.2; 502/327; 502/329; 502/341
[58] Field of Search ............... 423/239.1, 213.2; 502/327, 329, 341

[56] References Cited

U.S. PATENT DOCUMENTS

| 5,364,517 | 11/1994 | Dieckmann et al. | 208/121 |
| 5,562,884 | 10/1996 | Oakes et al. | 422/172 |
| 5,565,181 | 10/1996 | Dieckmann et al. | 423/239.1 |
| 5,658,542 | 8/1997 | Yoshida | 423/213.2 |
| 5,736,114 | 4/1998 | Barthe et al. | 423/213.2 |

FOREIGN PATENT DOCUMENTS

| 07080300 | 3/1995 | Japan . |
| 07080318 | 3/1995 | Japan . |
| 08024649 | 1/1996 | Japan . |

OTHER PUBLICATIONS

Japanese Laid Open Patent Publication No. 6–269669; filed Sep. 27, 1994.
Japanese Laid Open Patent Publication No. 7–24317; Jan. 27, 1995.
Japanese Laid Open Patent Publication No. 7–80300; Mar. 28, 1995.
Abstract obtained from database Derwent; HEI 6 269669/94; Application No. 05–063799; filed Mar. 23, 1993; "Nitrogen Oxide Purifying Catalyst".
Abstract obtained from database Derwent; Hei–7–24317; Application No.: 05–174320 (JP 93174320); Filed: Jul. 14, 1993; Oxide Catalyst Material & Method for Removing Nitrogen Oxide.
Abstract obtained from database Derwent; Hei–7–80300; Application No.: 05–224544 (JP 93224544); Filed: Sep. 9, 1993 Oxide Catalyst Material & Method for Removing Nitrogen Oxide.

*Primary Examiner*—Gary P. Straub
*Assistant Examiner*—Melanie C. Wong
*Attorney, Agent, or Firm*—Dougherty & Troxell

[57] ABSTRACT

A catalytic material for removing nitrogen oxides comprises a complex oxide as main phase. The complex oxide has a spinel structure and contains metallic elements of Al, Ga, and Zn. The mole fraction x (%) of Zn on oxide basis is greater than 0 and less than 50. Nitrogen-oxides-containing gas and a reductant such as methane or propylene are brought into contact with the catalytic material so as to remove, through reduction, nitrogen oxides from the nitrogen-oxides-containing gas. The catalytic material can be used to remove nitrogen oxides contained in exhaust gas from an automobile or the like. The catalytic material can remove nitrogen oxides even in exhaust gas of a high oxygen concentration and requires no toxic reductant such as ammonia.

10 Claims, 1 Drawing Sheet

CATALYTIC MATERIAL FOR REMOVING NITROGEN OXIDES APPARATUS FOR TREATING NITROGEN OXIDES USING THE MATERIAL, AND METHOD OF REMOVING NITROGEN OXIDES

BACKGROUND OF THE INVENTION

1. Field of the Invention

The present invention relates to a catalytic material for removing nitrogen oxides in exhaust gas emitted from, for example, various kinds of combustion engines, to an apparatus for treating nitrogen oxides using the material, and to a method of removing nitrogen oxides.

2. Description of the Related Art

With environmental pollution having been raising a problem in recent years, a method of decomposing and removing harmful substances such as nitrogen oxides in exhaust gas is in urgent need of development. Examples of catalytic methods practically used for purifying exhaust gas include a three-way-catalyst method, which simultaneously removes carbon monoxide (CO), hydrocarbons (HC), and nitrogen oxides (NOx), and a selective catalytic reduction method, in which ammonia is used as a reductant. The three-way-catalysts in common use include a heat-resistant carrier, such as cordierite coated with γ-alumina, supporting noble metals such as Pd, P and Rh. For the ammonia selective reduction method, oxides of metal such as V, Ti, and W are commonly used as the catalyst.

However, a three-way-catalyst has a drawback that the aforementioned noble metals are poisoned by excess oxygen existing in exhaust gas. As a result, their activities are significantly deteriorated. Therefore, the effect of purifying exhaust gas is available only in a narrow range around the stoichiometric air fuel ratio. In this connection, ion-exchanged zeolites have been studied for use as a catalyst which works even under an excess-oxygen atmosphere, but so far such zeolites have failed to exhibit sufficient heat resistance and water resistance.

By contrast, the ammonia selective reduction method is practically used in stationary combustion equipment as found in thermal power plants, and is capable of removing nitrogen oxides even when excess oxygen is present. However, this method involves a safety problem when it is used in urban areas or mobile units, due to toxicity and danger of ammonia.

SUMMARY OF THE INVENTION

The present invention has been accomplished to solve the above-mentioned problems, and an object of the invention is to provide a catalytic material which is capable of removing nitrogen oxides even in exhaust gas of a high oxygen concentration emitted from, for example, lean-burn engines and diesel engines and which requires no toxic reductant such as ammonia.

Another object of the present invention is to provide an apparatus for treating nitrogen oxides using the catalytic material.

Still another object of the present invention is to provide a method of removing nitrogen oxides using the catalytic material.

To achieve the above object, according to a first aspect of the present invention, there is provided a catalytic material for removing nitrogen oxides, comprising a complex oxide, as main phase, which has a spinel structure and contains metallic elements of Al, Ga, and Zn, the mole fraction x (%) of Zn on oxide basis being greater than 0 and less than 50.

According to a second aspect of the present invention, there is provided a catalytic material for removing nitrogen oxides, comprising a complex oxide, as main phase, which has the spinel structure and contains metallic elements of Al, Ga, and Zn, the mole fraction y (%) of Al on oxide basis being greater than 0 and less than 80, the mole fraction z (%) of Ga on oxide basis being greater than 0 and less than 80, the mole fraction x (%) of Zn on oxide basis being greater than 0 and less than 50.

According to a third aspect of the present invention, there is provided an apparatus for treating nitrogen oxides, which is partly or entirely formed of the catalytic material for removing nitrogen oxides according to the first or second aspect.

According to a fourth aspect of the present invention, there is provided a method of removing nitrogen oxides, comprising a step of bringing nitrogen-oxides-containing gas and a reductant in contact with the catalytic material for removing nitrogen oxides according to the first or second aspect to thereby remove nitrogen oxides through reduction.

According to a fifth aspect of the present invention, the reductant used in the method of the fourth aspect is methane.

According to a sixth aspect of the present invention, the reductant used in the method of the fourth aspect is propylene.

The catalytic material of the present invention can remove nitrogen oxides through reduction with the reductant such as hydrocarbons, and is advantageously used as a catalyst for purifying exhaust gas emitted from internal combustion engines.

Also, the catalytic material of the present invention can remove nitrogen oxides even when used in exhaust gas of a high oxygen concentration as emitted from lean-burn engines and diesel engines, and further has an advantage that It is unnecessary to use a toxic reductant such as ammonia. In addition, even when methane is used as a reductant, the catalytic material can effectively remove nitrogen oxides and is thus applicable to natural gas-fueled combustion engines such as gas engines and gas turbines.

Accordingly, the apparatus for treating nitrogen oxides which is made of the catalytic material for removing nitrogen oxides of the present invention, can effectively purify exhaust gas.

DESCRIPTION OF THE INVENTION AND PREFERRED EMBODIMENTS

Invention of the First Aspect

Figure 1:
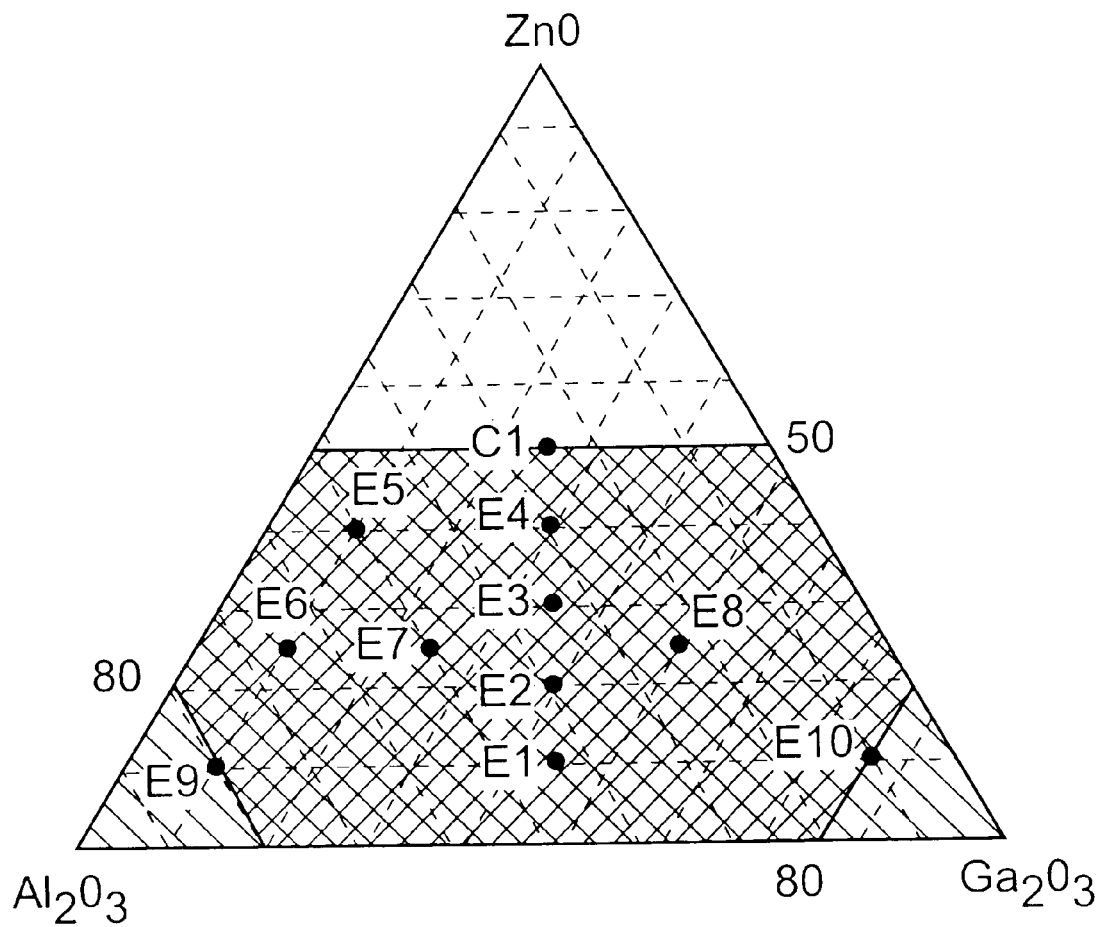
FIG. 1 is a pseudo ternary phase diagram showing the composition range of the present invention and compositions of examples.

As a result of extensive studies, the inventors of the present invention found that a complex oxide which contains aluminum (Al), zinc (Zn), and gallium (Ga) as main metallic elements and has a specific crystal structure exhibits a high reducing action on nitrogen oxides, and thus achieved the present invention.

(1) A complex oxide which constitutes the catalytic material for removing nitrogen oxides of the present invention contains metallic elements of Al, Ga, and Zn, and has the spinel structure. A mole fraction x (%) of Zn on oxide basis is greater than 0 and less than 50.

This complex oxide having the spinel structure is a solid solution which takes an amount of ZnO, x, greater than 0 and less than 50 mol % and arbitrary amounts of $Al_2O_3$ and $Ga_2O_3$ on the ternary phase diagram of the pseudo $ZnO$-$Al_2O_3$-$Ga_2O_3$ system (that is, a solid solution capable of continuously varying its composition). FIG. 1 shows the ternary phase diagram of this pseudo system. In FIG. 1, the present invention encompasses a hatched portion (excluding boundaries).

When the amount of ZnO becomes 50 mol % or larger, crystals having other than the spinel structure will be formed, resulting in a potential deterioration in catalytic activity. Thus, the range of the present invention is preferred.

Upon contact with exhaust gas emitted from, for example, an internal combustion engine, a material comprising a complex oxide having the above-described structure can remove nitrogen oxides (NOx) from the exhaust gas through reduction using, as a reductant, a hydrocarbon or the like contained in the exhaust gas.

This mechanism is not fully elucidated, but imbalanced charges and an increase of specific surface area associated with a solid solution (variation of composition) seem to bring improvement in characteristics of reducing nitrogen oxides.

(2) The catalytic material for removing nitrogen oxides of the present invention may be manufactured by a method comprising the steps of, for example, dissolving Al, Zn, and Ga nitrates in pure water, hydrolyzing the resulting solution, and evaporating the hydrolyzed solution to dryness and heat-treating the dryness at a temperature of 500° C. or higher. Alternatively, the solution of Al, Zn, and Ga nitrates is directly evaporated to dryness and the dryness is subjected to heat-treating at a temperature of 500° C. or higher. The most preferable heat treatment temperature ranges from 600° C. to 1000° C. This temperature range allows crystals having the spinel structure to sufficiently grow to thereby yield good powder having a large specific surface area and involving no decomposition.

An alternative method may comprise the steps of wet mixing Al, Zn, and Ga oxides using a ball mill and drying and heat-treating the resulting mixture.

The catalytic material for removing nitrogen oxides of the present invention is not limited to products manufactured by the above-described methods.

(3) The catalytic material for removing nitrogen oxides of the present invention is not particularly limited so long as the above-described complex oxide is contained as a main component, because the presence of the complex oxide as a main component enables an expected function to be sufficiently exhibited. In other words, the catalytic material may contain small amounts of unreacted compounds of component elements, compounds other than the complex oxide, and unavoidable impurities. However, in order to improve the efficiency of removal of nitrogen oxides, preferably, only the above-described complex oxide is contained as a single constitutive phase.

Invention of the Second Aspect

A complex oxide which constitutes the catalytic material for removing nitrogen oxides of the present invention contains metallic elements of Al, Ga, and Zn, and has the spinel structure. A mole fraction y (%) of Al on oxide basis is greater than 0 and 80 or less than 80, the mole fraction z (%) of Ga on oxide basis is greater than 0 and 80 or less than 80, and the mole fraction x (%) of Zn on oxide basis is greater than 0 and less than 50.

This complex oxide having the spinel structure is a solid solution capable of continuously varying its composition over the range wherein the amount of ZnO ranges from 0 to 50 mol % and the amount of $Al_2O_3$ and the amount of $Ga_2O_3$ range from 0 to 80 mol %. FIG. 1 shows the ternary phase diagram of this system. In FIG. 1, the present invention encompasses the overlapped section of those portions hatched in different directions.

Deviation from the above-described ranges of composition will cause the formation of a byproduct and a decrease of specific surface area, resulting in a potential deterioration in catalytic activity. Thus, the ranges of the present invention are preferred.

Invention of the Third Aspect

An apparatus for treating nitrogen oxides is partially or entirely formed of the above-described catalytic material for removing nitrogen oxides. For example, exhaust gas emitted from an automobile is led into the apparatus to thereby bring nitrogen oxides contained in the exhaust gas and a reductant such as a hydrocarbon into contact with the catalytic material so as to reduce the nitrogen oxides to nitrogen, whereby the exhaust gas can be purified effectively.

As for the construction of the apparatus for treating nitrogen oxides, for example, a heat-resistant container filled with the above-described catalytic material may be provided in a passage of gas to be treated or at the end portion of the passage, or alternatively, the entire apparatus may be constructed of the catalytic material. In this case, in order to increase purifying efficiency through an increase in effective area of contact with exhaust gas, the catalytic material preferably assumes the form of powder, grains, pellets, or a honeycomb, or the like.

Invention of the Fourth Aspect

Nitrogen oxides-containing gas and a reductant, for example, a hydrocarbon or alcohol, are brought in contact with the above-described catalytic material for removing nitrogen oxides to thereby remove nitrogen oxides through reduction.

Invention of the Fifth Aspect

Nitrogen oxides-containing gas and methane as a reductant are brought in contact with the above-described catalytic material for removing nitrogen oxides to thereby remove nitrogen oxides through reduction.

Invention of the Sixth Aspect

Nitrogen oxides-containing gas and propylene as a reductant are brought in contact with the above-described catalytic material for removing nitrogen oxides to thereby remove nitrogen oxides through reduction.

Since methane is a saturated hydrocarbon, it is usually inactive as a reductant for nitrogen oxides. However, when methane, together with nitrogen oxides-containing gas, is brought in contact with the above-described catalytic material for removing nitrogen oxides, nitrogen oxides can be removed through reduction.

Stationary combustion equipment such as a gas turbine uses natural gas, whose main component is methane, as fuel. In this case, since the catalytic material enables unburnt methane to be used as a reductant, it is not necessary to add a reductant.

EXAMPLES

The catalytic material for removing nitrogen oxides of the present invention and the method of manufacturing the same will next be described by way of example.

First will be described a method of manufacturing the catalytic material for removing nitrogen oxides of the present invention, i.e. a method of manufacturing a complex oxide.

Example 1

Guaranteed reagent grade chemicals of aluminum nitrate ($Al(NO_3)_3.9H_2O$), gallium nitrate ($Ga(NO_3)_3.3H_2O$), and zinc nitrate $(Zn(NO_3)_2 \cdot 6H_2O)$ were dissolved in pure water. In this case, the amount of $Al_2O_3$ was 45 mol %, the amount of $Ga_2O_3$ was 45 mol %, and the amount of ZnO was 10 mol %, all being on oxide basis.

Subsequently, to the resulting solution, 7% aqueous ammonia was added dropwise for hydrolysis, obtaining a precipitate.

Next, the thus-obtained precipitate was evaporated to dryness at a temperature of 150° C. The resulting substance was ground in an alumina mortar.

The thus-ground dryness was heat-treated at a temperature of 800° C. for 6 hours in air, obtaining a synthetic powder.

It was confirmed by X-ray diffraction that this synthetic powder was a complex oxide having the spinel structure.

That is, by this manufacturing method, a complex oxide was obtained which contains, on oxide basis, 45 mol % of $Al_2O_3$, 45 mol % of $Ga_2O_3$, and 10 mol % of ZnO and has the spinel structure.

Example 2

A synthetic powder was obtained in a manner similar to Example 1 except that the composition on oxide basis was as follows: $Al_2O_3$ (40 mol %), $Ga_2O_3$ (40 mol %), ZnO (20 mol %).

This synthetic powder was analyzed in a manner similar to Example 1 and was found to be a solid solution of a complex oxide having the spinel structure.

That is, by this manufacturing method, a complex oxide was obtained which contains, on oxide basis, 40 mol % of $Al_2O_3$, 40 mol % of $Ga_2O_3$, and 20 mol % of ZnO and has the spinel structure.

Example 3

A synthetic powder was obtained in a manner similar to Example 1 except that the composition on oxide basis was as follows: $Al_2O_3$ (35 mol %), $Ga_2O_3$ (35 mol %), ZnO (30 mol %).

This synthetic powder was analyzed in a manner similar to Example 1 and was found to be a solid solution of a complex oxide having the spinel structure.

That is, by this manufacturing method, a complex oxide was obtained which contains, on oxide basis, 35 mol % of $Al_2O_3$, 35 mol % of $Ga_2O_3$, and 30 mol % of ZnO and has the spinel structure.

Example 4

A synthetic powder was obtained in a manner similar to Example 1 except that the composition on oxide basis was as follows: $Al_2O_3$ (30 mol %), $Ga_2O_3$ (30 mol %), ZnO (40 mol %).

This synthetic powder was analyzed in a manner similar to Example 1 and was found to be a solid solution of a complex oxide having the spinel structure.

That is, by this manufacturing method, a complex oxide was obtained which contains, on oxide basis, 30 mol % of $Al_2O_3$, 30 mol % of $Ga_2O_3$, and 40 mol % of ZnO and has the spinel structure.

Example 5

A synthetic powder was obtained in a manner similar to Example 1 except that the composition on oxide basis was as follows: $Al_2O_3$ (50 mol %), $Ga_2O_3$ (10 mol %), ZnO (40 mol %).

This synthetic powder was analyzed in a manner similar to Example 1 and was found to be a solid solution of a complex oxide having the spinel structure.

That is, by this manufacturing method, a complex oxide was obtained which contains, on oxide basis, 50 mol % of $Al_2O_3$, 10 mol % of $Ga_2O_3$, and 40 mol % of ZnO and has the spinel structure.

Example 6

A synthetic powder was obtained in a manner similar to Example 1 except that the composition on oxide basis was as follows: $Al_2O_3$ (65 mol %), $Ga_2O_3$ (10 mol %), ZnO (25 mol %).

This synthetic powder was analyzed in a manner similar to Example 1 and was found to be a solid solution of a complex oxide having the spinel structure.

That is, by this manufacturing method, a complex oxide was obtained which contains, on oxide basis, 65 mol % of $Al_2O_3$, 10 mol % of $Ga_2O_3$, and 25 mol % of ZnO and has the spinel structure.

Example 7

A synthetic powder was obtained in a manner similar to Example 1 except that the composition on oxide basis was as follows: $Al_2O_3$ (50 mol %), $Ga_2O_3$ (25 mol %), ZnO (25 mol %).

This synthetic powder was analyzed in a manner similar to Example 1 and was found to be a solid solution of a complex oxide having the spinel structure.

That is, by this manufacturing method, a complex oxide was obtained which contains, on oxide basis, 50 mol % of $Al_2O_3$, 25 mol % of $Ga_2O_3$, and 25 mol % of ZnO and has the spinel structure.

Example 8

A synthetic powder was obtained in a manner similar to Example 1 except that the composition on oxide basis was as follows: $Al_2O_3$ (25 mol %), $Ga_2O_3$ (50 mol %), ZnO (25 mol %).

This synthetic powder was analyzed in a manner similar to Example 1 and was found to be a solid solution of a complex oxide having the spinel structure.

That is, by this manufacturing method, a complex oxide was obtained which contains, on oxide basis, 25 mol % of $Al_2O_3$, 50 mol % of $Ga_2O_3$, and 25 mol % of ZnO and has the spinel structure.

Example 9

A synthetic powder was obtained in a manner similar to Example 1 except that the composition on oxide basis was as follows: $Al_2O_3$ (80 mol %), $Ga_2O_3$ (10 mol %), ZnO (10 mol %).

This synthetic powder was analyzed in a manner similar to Example 1 and was found to be a solid solution of a complex oxide having the spinel structure.

That is, by this manufacturing method, a complex oxide was obtained which contains, on oxide basis, 80 mol % of $Al_2O_3$, 10 mol % of $Ga_2O_3$, and 10 mol % of ZnO and has the spinel structure.

Example 10

A synthetic powder was obtained in a manner similar to Example 1 except that the composition on oxide basis was as follows: $Al_2O_3$ (10 mol %), $Ga_2O_3$ (80 mol %), ZnO (10 mol %).

This synthetic powder was analyzed in a manner similar to Example 1 and was found to be a solid solution of a complex oxide having the spinel structure.

That is, by this manufacturing method, a complex oxide was obtained which contains, on oxide basis, 10 mol % of $Al_2O_3$, 80 mol % of $Ga_2O_3$, and 10 mol % of ZnO and has the spinel structure.

Comparative Example 1

A synthetic powder was obtained in a manner similar to Example 1 except that the composition on oxide basis was as follows: $Al_2O_3$ (25 mol %), $Ga_2O_3$ (25 mol %), ZnO (50 mol %).

This synthetic powder was analyzed in a manner similar to Example 1 and was found to be a solid solution of a complex oxide having the spinel structure.

That is, by this manufacturing method, a complex oxide was obtained which contains Al, Ga, and Zn and has the spinel structure. However, the amount of ZnO contained in this complex oxide was 50 mol %, which falls outside the relevant range of the present invention.

Test Example

Next, a description will be given of a test conducted to confirm the effect of Examples as the catalytic materials for removing nitrogen oxides.

The synthetic powder obtained in each of Examples 1–10 and Comparative Example 1 was formed into a pellet under a compacting pressure of 200 kg/cm². The resulting compact was pulverized, followed by sieving with a 26- to 50-mesh. Five hundred mg of the thus-sieved powder was placed in a reaction tube made of quartz glass. Helium gas containing NO (1000 ppm), $C_3H_6$ or $CH_4$ (1000 ppm), and $O_2$ (6%) was flowed through the reaction tube at a flow rate of 100 ml/min (SV: 10000 to 15000 h$^{-1}$). The $C_3H_6$ (propylene) and $CH_4$ (methane) were used as reductants.

The composition of gas emitted from the reaction tube was evaluated for characteristics of reducing nitrogen oxides using a chemiluminescence NOx analyzer and a gas chromatograph. Specifically, the chemiluminescence NOx analyzer was used to measure the concentration of NOx contained in the gas emitted from the reaction tube, and the gas chromatograph was used to measure the concentrations of $N_2$, $O_2$, CO, $CO_2$, $CH_4$, and $C_3H_6$. The temperature range of the measurement was 300 to 700° C. Based on the thus-obtained measurements, the conversion rate from NO to $N_2$ was obtained. Also, the specific surface area of each synthetic powder was measured by the known BET method.

The results of the above-described test are shown below in Tables 1 and 2. Table 1 shows the compositions of the catalytic materials of Examples 1 to 10 and Comparative Example 1. Table 2 shows the specific surface area and the maximum conversion rate of each catalytic material and a temperature at which the conversion rate reached the maximum (because conversion rate varies with temperature). The compositions of the catalytic materials are also shown in FIG. 1, where E1 to E10 denote Examples 1 to 10, respectively, and C1 denotes Comparative Example 1.

The NO-conversion rate (%) is calculated by the following equation:

NO-conversion rate (%)={(amount of fed NO−amount of emitted NO)/(amount of fed NO)}×100

TABLE 1

|  | Composition (mol %) | | |
| --- | --- | --- | --- |
|  | $Al_2O_3$ | $Ga_2O_3$ | ZnO |
| Example 1 | 45 | 45 | 10 |
| Example 2 | 40 | 40 | 20 |
| Example 3 | 35 | 35 | 30 |
| Example 4 | 30 | 30 | 40 |
| Example 5 | 50 | 10 | 40 |
| Example 6 | 65 | 10 | 25 |
| Example 7 | 50 | 25 | 25 |
| Example 8 | 25 | 50 | 25 |
| Example 9 | 80 | 10 | 10 |
| Example 10 | 10 | 80 | 10 |
| Comparative example 1 | 25 | 25 | 50 |

TABLE 2

|  |  | Reductant: propylene | | Reductant: methane | |
| --- | --- | --- | --- | --- | --- |
|  | Specific surface area (m²/g) | Maximum NO-conversion rate (%) | Temp. (° C.) | Maximum NO-conversion rate (%) | Temp. (° C.) |
| Example 1 | 90.9 | 80.0 | 500 | 43.8 | 550 |
| Example 2 | 66.0 | 87.8 | 500 | 47.8 | 550 |
| Example 3 | 55.7 | 89.7 | 500 | 65.3 | 550 |
| Example 4 | 42.9 | 86.8 | 450 | 50.1 | 500 |
| Example 5 | 115.8 | 91.8 | 500 | 36.7 | 550 |
| Example 6 | 64.9 | 93.8 | 450 | 56.2 | 500 |
| Example 7 | 82.9 | 82.2 | 500 | 23.1 | 550 |
| Example 8 | 67.0 | 87.6 | 500 | 38.4 | 550 |
| Example 9 | 170.3 | 77.7 | 500 | — | — |
| Example 10 | 43.8 | 84.7 | 500 | — | — |
| Comparative example 1 | 19.6 | 76.4 | 500 | 19.8 | 550 |

As seen from Tables 1 and 2, the catalytic materials for removing nitrogen oxides in Examples 1 to 10, whose compositions fall within the ranges of the present invention, exhibit a relatively large specific surface area, and a relatively large NO-conversion rate. By contrast, the catalytic material of Comparative Example 1 exhibits a relatively small specific surface area and particularly exhibits an unpreferably low NO-conversion rate when methane is used as a reductant.

As described above, the catalytic materials for removing nitrogen oxides of Examples have an advanced function to reduce nitrogen oxides through contact of nitrogen oxides and a reductant such as a hydrocarbon therewith, and are thus suited for purifying high-temperature exhaust gas emitted from internal combustion engines as of automobiles.

Accordingly, when any of the catalytic materials in the form of powder is filled into an exhaust gas purifier provided in an exhaust gas passage of an automobile or the like, as it is or after being formed into grains, pellets, or a honeycomb shape, nitrogen oxides contained in exhaust gas emitted from the automobile or the like can be effectively removed through reduction.

Also, even when methane is used as a reductant, the catalytic materials for removing nitrogen oxides of Examples enable nitrogen oxides to be reduced. Thus, the catalytic materials are also applicable to natural gas-fueled combustion engines such as gas engines.

Further, the catalytic material can be applied to these combustion engines whether they are mobile or stationary.

Obviously, numerous modifications and variations of the present invention are possible in light of the above teachings. It is therefore to be understood that within the scope of the appended claims, the present invention may be practiced otherwise than as specifically described herein.

What is claimed is:

1. A catalytic material for removing nitrogen oxides, comprising a complex oxide as a main phase, said complex oxide having a spinel structure and containing metallic elements of Al, Ga, and Zn, and in said complex oxide the mole fraction x (%) of Zn on oxide basis is greater than 0 and less than 50 and wherein said complex oxide has a specific surface area of at least about 42.9 $m^2/gm$.

2. A method of removing nitrogen oxides, comprising a step of bringing nitrogen-oxides-containing gas and a reductant in contact with the catalytic material for removing nitrogen oxides according to claim 1 to thereby remove nitrogen oxides through reduction.

3. A method of removing nitrogen oxides according to claim 2, wherein the reductant is methane.

4. A method of removing nitrogen oxides according to claim 2, wherein the reductant is propylene.

5. A catalytic material for removing nitrogen oxides, comprising a complex oxide as main phase, said complex oxide having a spinel structure and containing metallic elements of Al, Ga, and Zn, and in said complex oxide the mole fraction y (%) of Al on oxide basis is greater than 0 and less than 80, the mole fraction z (%) of Ga on oxide basis is greater than 0 and less than 80, the mole fraction x (%) of Zn on oxide basis is greater than 0 and less than 50.

6. A method of removing nitrogen oxides, comprising a step of bringing nitrogen-oxides-containing gas and a reductant in contact with the catalytic material for removing nitrogen oxides according to claim 5 to remove nitrogen oxides through reduction.

7. A method of removing nitrogen oxides according to claim 6, wherein the reductant is methane.

8. A method of removing nitrogen oxides according to claim 6, wherein the reductant is propylene.

9. A catalytic material in accordance with claim 5 wherein said complex oxide has a specific surface area of at least about 42.9 $m^2/gm$.

10. A catalytic material in accordance with claim 5 wherein the mole fraction x (%) of Zn on oxide basis is between about 10 and about 40.

* * * * *